(12) United States Patent
Thomas et al.

(10) Patent No.: US 6,336,686 B2
(45) Date of Patent: Jan. 8, 2002

(54) MODULAR DISC BRAKE AND ACTUATOR LEVEL THEREFOR

(75) Inventors: Paul Antony Thomas, Gwent (GB); Andre Luciano D'Andrea Mathias, Centro-Limeira (BR)

(73) Assignee: Lucas Industries PLC, Solihull (GB)

( * ) Notice: Subject to any disclaimer, the term of this patent is extended or adjusted under 35 U.S.C. 154(b) by 0 days.

(21) Appl. No.: 09/883,362

(22) Filed: Jun. 19, 2001

Related U.S. Application Data (62) Division of application No. 09/091,410, filed as application No. PCT/GB96/03161 on Dec. 19, 1996.

(30) Foreign Application Priority Data

Dec. 20, 1995 (GB) .............................................. 9526019

(51) Int. Cl.$^7$ .............................................. F16D 65/16
(52) U.S. Cl. .................... 303/2; 188/72.7; 188/72.9
(58) Field of Search ............................. 303/2; 188/72.9, 188/72.7, 71.8, 71.9, 71.7

(56) References Cited

U.S. PATENT DOCUMENTS 5,819,884 A * 10/1998 Giering ...................... 188/71.9
5,833,035 A * 11/1998 Severinsson ................ 188/72.7

FOREIGN PATENT DOCUMENTS

| DE | 4212353 | * 10/1993 | ................. 188/72.7 |
| JP | 2-102934 | * 4/1990 | ................. 188/72.7 |
| WO | 95/19511 | * 7/1995 | |

* cited by examiner

Primary Examiner—Matthew C. Graham
(74) Attorney, Agent, or Firm—Oblon, Spivak, McClelland, Maier & Neustadt, P.C.

(57) ABSTRACT

The present specification describes an actuating lever (21) for a disc brake (1, 7), having a cam section (23) with a part cylindrical curved surface (25) and a part cylindrical channel (27) with an elongate cylindrical force transmitting member (29) located therein and being parallel to the longitudinal axis of the said part cylindrical surface (25), and having opposite end regions which are located in recesses (31, 33) formed in the lever (21) at opposite ends of the said channel (27) to thus retain the force transmitting member (29) in position on the lever (21). The cam section (23) engages a mating curved support surface (41) on a cover plate (37) and is pivotal about said support surface (41), the lever (21) and cover plate (37) forming a modular assembly for a disc brake, the cover plate (37) being, in use, secured to a clamp member (1) of a disc brake (1, 7), the force transmitting member (29) then engaging a tappet (11) which can exert force on a friction pad (13) when the lever (21) is pivoted about the support surface (41).

15 Claims, 6 Drawing Sheets

MODULAR DISC BRAKE AND ACTUATOR LEVEL THEREFOR

This application is a Division of application Ser. No. 09/091,410 filed on Nov. 30, 1998, which was filed as Int'l. PCT/GB96/03161, filed Dec. 15, 1996.

The present invention relates to an actuator lever for a disc brake, a modular assembly incorporating an actuator lever, and a disc brake incorporating said actuator lever.

More particularly, the present invention relates to an actuator lever for a disc brake, a modular assembly incorporating an actuator lever, and a disc brake incorporating said actuator lever, of the type actuated by a fluid controlled brake applying means, particularly in the form of a pneumatically operated diaphragm cylinder.

In known constructions of pneumatically operated disc brakes the basic construction comprises an annular braking disc straddled by a clamp member or caliper containing an actuator mechanism which applies braking force to one side of the braking disc via a brake pad. The clamp member or caliper is mounted on a torque taking member so as to be slidable axially of the braking disc whereby when the first mentioned brake pad is applied to one side of the braking disc the clamp member/caliper slides axially of the brake disc to apply the other brake pad to the other side of the braking disc, thus completing the braking action. The brake pads are usually carried by the torque taking member which is fixedly secured to the vehicle.

In pneumatically operated disc brake constructions of known type the brake applying means incorporates a piston with a piston rod extending out of the chamber of the brake applying means, the piston engaging with a pivotal lever. In certain constructions the pivotal lever has at its end region remote from the said piston rod, a curved supporting surface which sits in an appropriate bearing which is located between the curved surface and a fixed surface in the brake construction. Provided on another part of this other end region of the lever is a force transmitting member in the form of a cylindrical rod or roller which is located in a complimentary channel in the said other end region of the lever with the force transmitting member being usually rotatable about its longitudinal axis in the said channel with an appropriate bearing e.g. a proprietary PVDF, PTFE and lead composition, located between the cylindrical force transmitting member and the surface of the channel. The channel is so located as to be axially offset from the pivotal axis of the said other end region of the-lever i.e. the centre of curvature of the cylindrical force transmitting member is spaced from the centre of curvature of the curved surface at the other end region of the lever. This cylindrical force transmitting member engages an axially moveable tappet which can be adjustable in length ice. It cooperates with an appropriate adjuster mechanism, the tappet acting either directly or via another member against the first mentioned friction pad. Thus by pivoting the lever about the said curved surface, the force transmitting member presses against the each tappet applying the first mentioned brake pad against one side of the brake disc. The clamp member/caliper thus slides axially of the braking disc applying the other brake pad to the other side of the brake disc.

The above type of brake may have one adjustable length tappet or more usually, two adjustable length tappets, with an adjuster mechanism coupled to the pivotal lever whereby the tappet can be adjusted in length to cater for pad wear, the adjuster assembly acting on one tappet which is coupled to the other tappet for equivalent adjustment.

Whilst on assembly the attachment of the diaphragm/piston brake applying means to the brake construction with the piston rod engaging one end of the actuating lever is basically quite simple, it will be appreciated that the assembly and construction of the lever with the appropriate bearings and the force transmitting member together with the tappets and adjuster mechanism is quite complicated and an expensive manufacturing operation. It is thus the aim of the present invention to simplify the construction and to provide an improved form of adjuster mechanism.

According to a first aspect of the present invention there is provided an actuating lever for a disc brake, comprising an elongate member, one end of which member is adapted to be, in use, engaged by brake applying means, the other end region of said member having a cam section with a part cylindrical curved surface having a longitudinal axis extending through the centre of curvature of said surface, transversely of the longitudinal axis of the elongate member, said other end region also having a part cylindrical channel formed therein in a region separate from the part cylindrical curved surface, with an elongate cylindrical force transmitting member located therein and extending radially outwardly of the channel, the cylindrical force transmitting member being parallel to the longitudinal axis of the said part cylindrical surface, and having opposite end regions which are located in recesses formed in the lever at opposite ends of the said channel to thus retain the force transmitting member in position on the lever.

In a preferred embodiment of the present invention a bearing e.g. a proprietary PVDF, PTFE and lead composition, is located between the cylindrical force transmitting member and the said channel to allow the force transmitting member to rotate therein about its longitudinal axis. Further, a series of teeth are provided adjacent to the cam section along a path following the said cylindrical cam section, these teeth, in use, being used to operate an adjuster to cater for pad wear.

According to a further aspect of the present invention there is provided an actuating lever for a disc brake comprising an elongate member, one end of which member is adapted to be, in use, engaged by brake applying means, the other end region of the elongate member having two cam sections which extend laterally in opposite directions from the elongate member, each cam section having a part cylindrical surface, said cylindrical surfaces being coaxial with each other, with their common longitudinal axis extending transversely on the longitudinal axis of said elongate member, each cam section having a part cylindrical channel formed in a region separate from the part cylindrical surface thereof, an elongate cylindrical force transmitting member being located in each said channel and extending radially outward therefrom, the axis of the respective channels and cylindrical force transmitting members being parallel to the longitudinal axis of the said part cylindrical surfaces, with the cylindrical force transmitting members each having opposite end regions which are located in recesses formed in the lever at opposite ends of the said channels to thus retain the respective force transmitting members in position in their respective channels in the lever.

In a preferred embodiment one recess is formed as a cylindrical blind bore in the said elongate member, and the other recess for retaining a force transmitting member is formed as a cylindrical bore in an extension of the cam section, with said cylindrical bore and said blind bore being coaxial with each other and with said channels. Thus, on assembly, a cylindrical force transmitting member can be passed axially through the cylindrical bore along the channel and engaged in the said blind bore, one end region being thus retained by the blind bore and the other end of the force transmitting, member then being retained in the cylindrical bore. During transit and initial assembly a plug e.g. a plastic or rubber plug, can be located in the cylindrical bore to close the bore and hold the force transmitting member in position.

Further, the lever arm i.e. the elongate member, is preferably formed as a generally triangular structure with said one end region of the elongate member being located at an upper corner and the lateral cam sections projecting in opposite directions from each of the lower two corners. In this generally triangular construction an aperture is formed in approximately the central region for the central location of an adjuster to cater for pad wear.

Also, gear teeth are preferably provided in the central region of the lever i.e. between the two cam sections, with the teeth following the general path of the curved surface of the respective cam sections, these gear teeth, in use, serving to operate the brake adjuster as the actuating lever is pivoted.

According to a further aspect of the present invention there is provided a modular assembly for a disc brake comprising a cover plate adapted to be, in use, secured to a clamp member of a disc brake, the plate having a curved support surface for an actuating lever comprising an elongate member, one end of which elongate member is adapted to be, in use, engaged by brake applying means, the other end region of said elongate member having a cam section with a part cylindrical curved surface having an elongate axis extending through the centre curvature of said surface, transversely of the longitudinal axis of the lever, said other end region also having a part cylindrical channel formed therein in a region separate from the part cylindrical curved surface, with an elongate cylindrical force transmitting member located therein and extending radially outwardly therefrom, the axis of the channel and the cylindrical force transmitting member being parallel to the longitudinal axis of the said part cylindrical surface, and the cylindrical force transmitting member having opposite end regions which are located in cylindrical recesses formed in the lever at opposite ends of said channel to thus retain the force transmitting member in position in the channel in the lever.

According to a still further aspect of the present invention there is provided a modular assembly for a disc brake comprising a cover plate adapted to be, in use, secured to a clamp member of a disc brake, said cover plate having two curved support surfaces for supporting an actuating lever comprising an elongate member, one end of which is adapted to be, in use, engaged by brake applying means, the other end region having two cam sections which extend laterally in opposite directions from the lever arm, each cam section having a part cylindrical surface, said part cylindrical surfaces being carried on the said curved support surfaces of the cover plate, with the coaxial longitudinal axis of the cam sections extending transversely of the longitudinal axis of said elongate member, each cam section having a part cylindrical channel formed therein in a region separate from the part cylindrical surface thereof, an elongate cylindrical force transmitting member being located in each channel and extending radially outwardly therefrom, the axis of the channels and said cylindrical force transmitting members being parallel to the longitudinal axis of the apart cylindrical surfaces, with the cylindrical force transmitting members having opposite end regions which are located in cylindrical recesses formed in the lever at opposite ends of the respective channels to thus retain the force transmitting members in position in said channels on the lever, with retaining means holding the cam sections with their respective curved surfaces engaged with bearings carried on the respective curved support surfaces of the cover plate whereby the lever is pivotable about the said curved support surfaces.

In a preferred embodiment of this still further aspect of the present invention the respective recesses holding the respective force transmitting members comprise one recess formed as a cylindrical blind bore located in one side of the elongate member, the other recess being formed as a cylindrical bore in an extension of the cam section, with said cylindrical bore and said blind bore being coaxially with each other and with said channels. Thus, on assembly, the cylindrical force transmitting member can be passed axially through the cylindrical bore in the extension of the cam section, along the channel and into the said blind bore. One end region of the force transmitting member is thus retained by the blind bore and the other end region is held in the said cylindrical bore with a retaining disc and circlip retaining the force transmitting member in axial position. Alternatively, the retaining means securing the cam sections i.e. lever, to the cover plate can be so designed to locate across and possibly within the cylindrical bore to hold the force transmitting members in position, obviating the need for a retaining disc and circlip.

Preferably a series of gear teeth are provided on the lever between one cam section and the said elongate member, the gear teeth following the path of the curved surface of the cam section. These gear teeth mesh with the teeth of a gear wheel rotationally mounted on the cover plate in the central region thereof. This gear wheel when rotated by pivotal lever movement engages with and moves an adjuster which is mounted on the cover plate and which extends through a centrally located aperture in the lever, the elongate member of said lever having a generally triangular configuration with a centrally located aperture through which the adjuster passes.

Thus, according to this further aspect of the present invention a modular assembly comprising a cover plate and pivotal actuating lever is provided which can be simply bolted to an appropriate design of clamp member with the force transmitting members engaging cylindrical tappets which, by pivoting of the actuating lever, are moved axially to apply force either directly or indirectly to a friction pad on one side of a braking disc. Further, pivoting of the actuating lever causes rotation of the said gear wheel and movement of the adjuster, this movement of the adjuster having lost motion and preferably comprising two coaxially located sections interconnected by a wrap spring, one section being engageable with lost motion by the said gear wheel and the other section carrying a gear wheel which meshes with corresponding gears provided on the respective tappets. Thus adjustment of the adjuster causes synchronous adjustment of the two tappets to cater for pad wear.

The present invention will now be further described, by way of example, with reference to the accompanying drawings in which.

Figure 1:
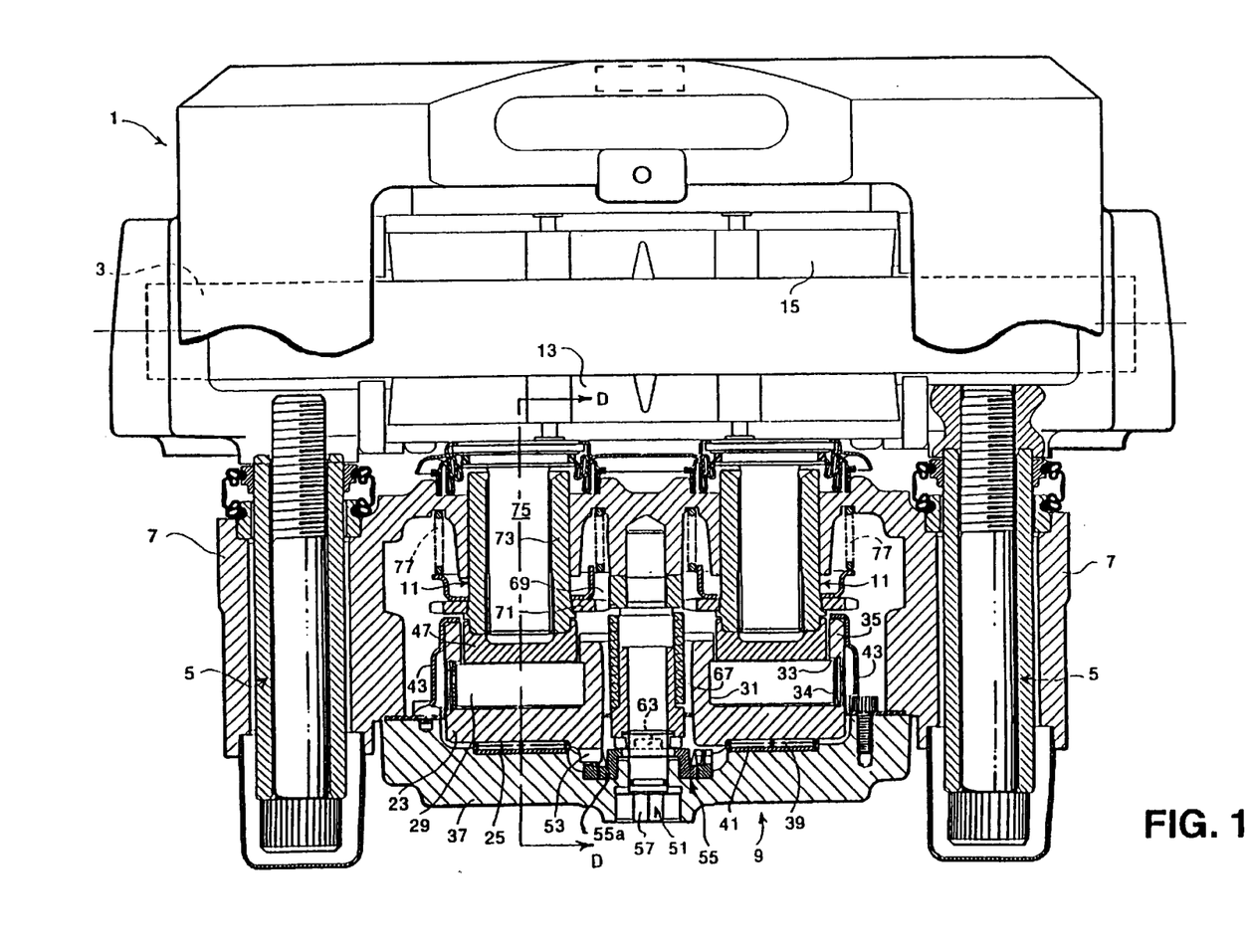
FIG. 1 is a partially cut away plan view of a preferred embodiment of the present invention incorporated in an appropriate disc brake.

A disc brake incorporating the present invention is shown in the accompanying drawings and is best seen in FIG. 1. The disc brake comprises a clamp member 1 which straddles a part of the periphery of a braking disc 3 which is rotatable about its central axis, the clamp member 1 being slidably mounted by virtue of sliding pin arrangements 5, on a torque taking member 7 which, in use, is fixedly mounted on a vehicle of which the disc brake forms a part. The clamp member 1 incorporates an actuating mechanism 9 which is operable by brake applying means in the form of a pneumatic diaphragm/piston unit (not shown) to force a pair of tappets 11 to move axially to engage and apply a friction pad 13 against one side of the braking disc 3, the clamp member 1 thus sliding on sliding pin arrangements 5 to apply another friction pad 15 against the other side of the braking disc 3. Thus the brake is applied.

Figure 2:
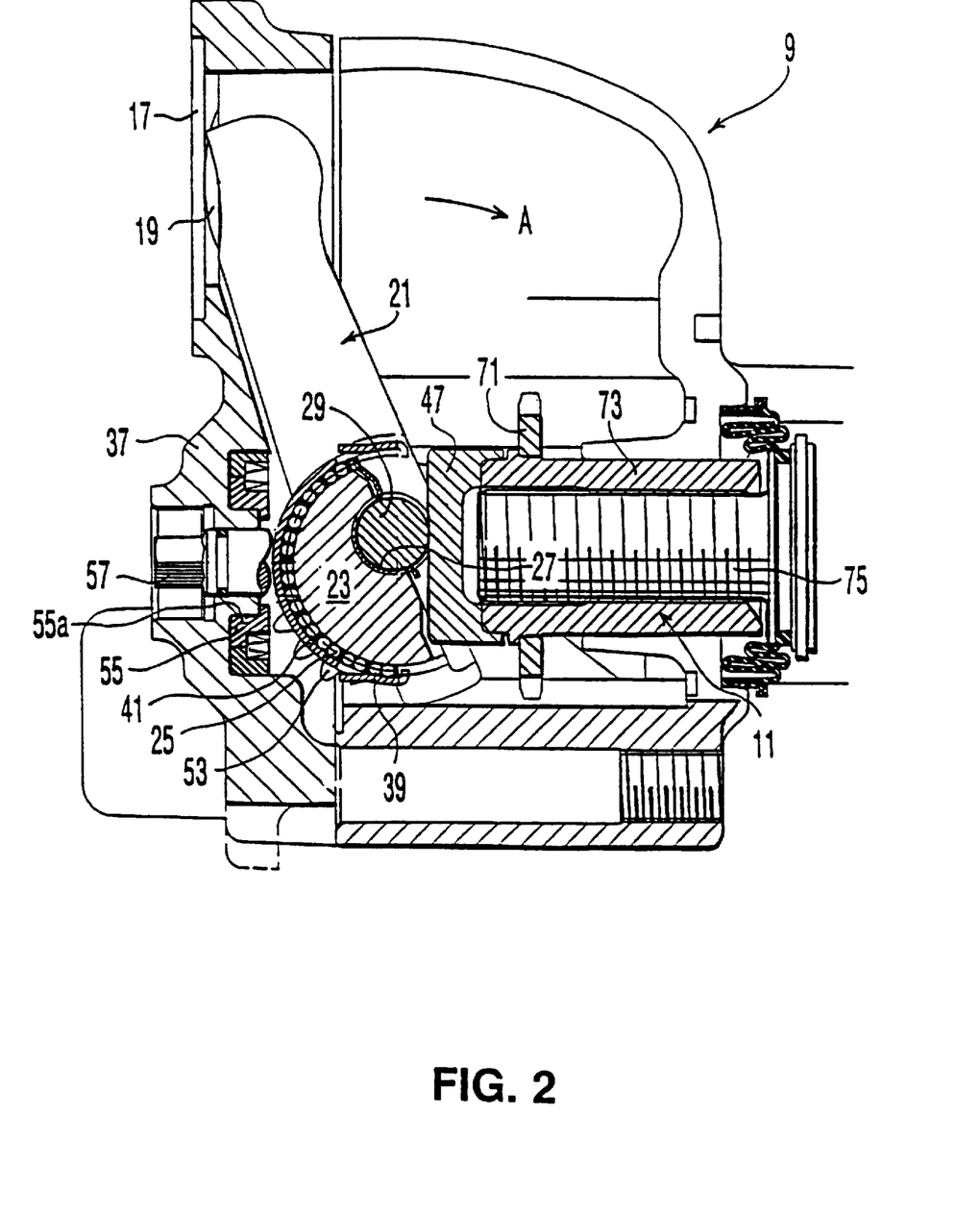
FIG. 2 is a cross-sectional view taken along line A—A in FIG. 1.
Figure 3:
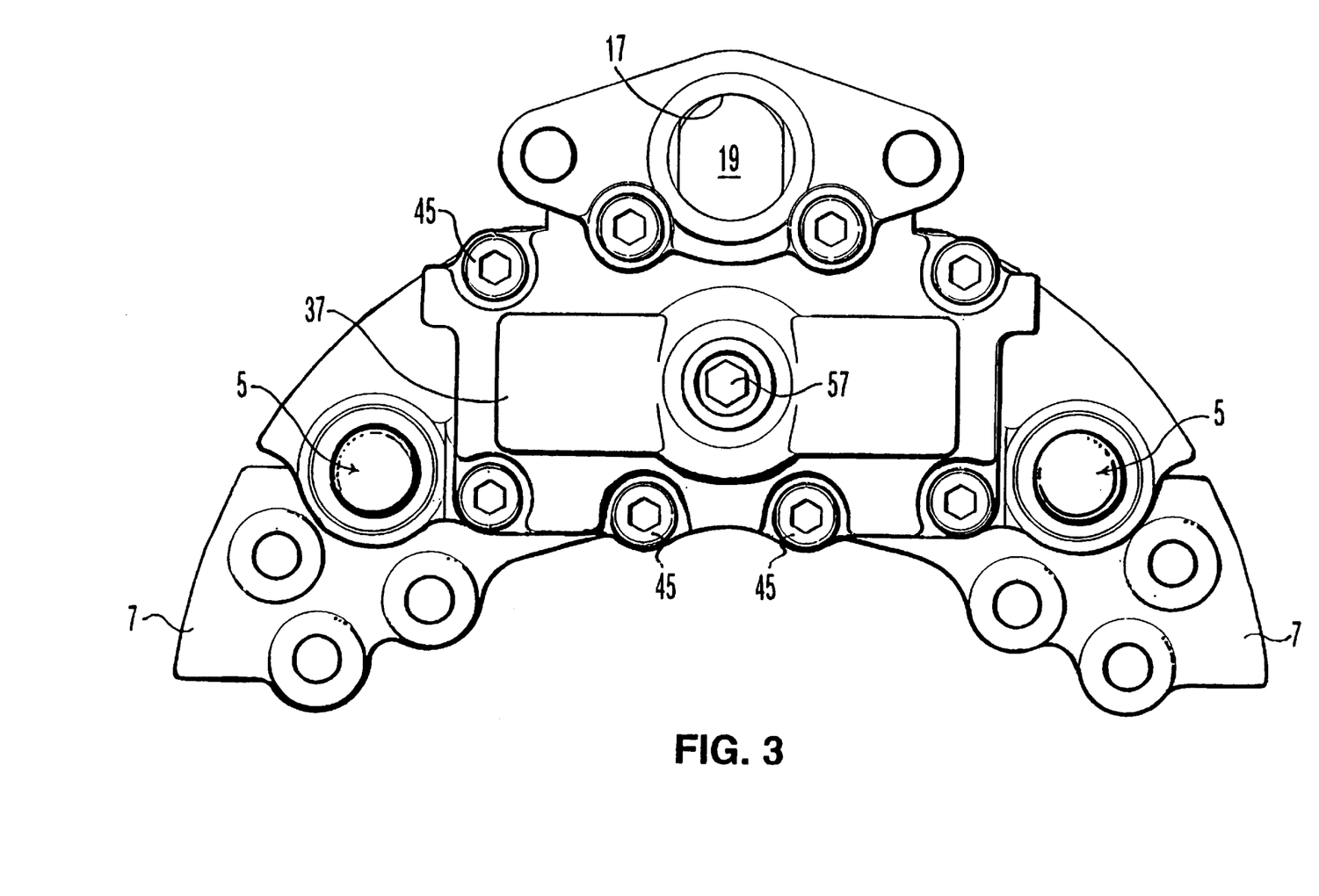
FIG. 3 illustrates the attachment of the cover plate assembly and actuating lever to the clamp member.

Referring to FIGS. 1, 2 and 3 of the accompanying drawings, the brake applying means (not shown) is attached to the clamp member so that a piston rod (not shown) extends through an aperture 17 in the actuator 9 to engage in a curved recess 19 in one end region of an elongate actuating lever 21. The other end region of the elongate actuating lever 21 is provided with two laterally extending cam sections 23, these cam sections 23 extending in opposite directions transverse to the longitudinal axis of the elongate actuating lever 21. Each cam section 23 has a part cylindrical surface 25, the centres of curvature of these respective surfaces being coaxial with each other. Also, each cam section 23 has a part cylindrical channel 27 located in a region facing in the opposite direction to the said curved surface 25. A cylindrical force transmitting member 29 is located in each channel 27 with a bearing material e.g. a bearing made of a proprietary PVDF, PTFE and lead composition, located therebetween, one end of each force transmitting member 29 engaging in a recess in the form of a cylindrical blind bore 31 in the lever arm 21, with the other end of each force transmitting member being retained in a cylindrical bore 33 provided in an extension 35 of each cam section 23. The cylindrical blind bore 31 and the cylindrical bore 33 are coaxial with each other and with the centre of curvature of the associated channel 27, the cylindrical force transmitting member being held axially in position in the respective bores by a retaining disc 34 and a circlip 36 (see FIG. 5) which engages in an annual groove provided in the wall of the cylindrical bore 33. Thus the force transmitting members 29 are retained in the channels 27.

Figure 5:
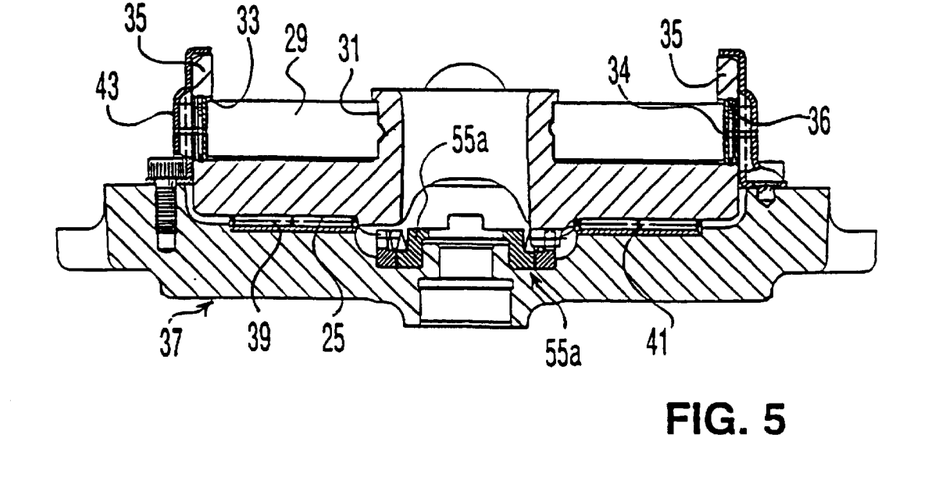
FIG. 5 is a sectional view along line B—B in FIG. 4.
Figure 6:
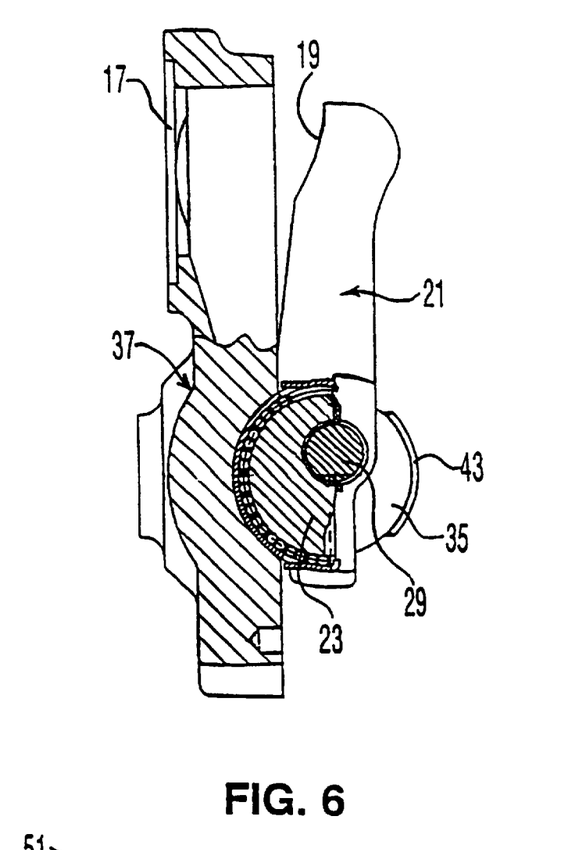
FIG. 6 is a sectional view along line C—C in FIG. 4.

As best seen in FIGS. 1 and 5 the lever arm 21 is mounted on cam sections 23 engaging via bearings 39, respective ,curved supporting surfaces 41 formed in the cover plate 37. Thus the cam sections 23 are pivotal on the curved supporting surfaces 41, the cam sections being retained in position on the cover plate 37 by retaining means 43 which are bolted to an inner face of the cover plate 37, the retaining means 43 taking the form of a metal frame which merely extends over the end of the extensions 35 of the respective cam sections 23, the retaining means allowing for rotational movement of the cam sections 23. Thus a modular cover plate 37 and lever arm 21 are formed in accordance with the present invention, it being possible for this assembly to be manufactured and simply assembled in the actuator 9, facilitating subsequent servicing of the actuator 9, the cover plate merely being secured in the clamp member 1 by a number of bolts 45.

With the modular assembly 37/21 secured in the actuator 9 by the bolts 45, the respective force transmitting members 29 engage against end regions 47 of the two tappets generally designated 11. The end regions 47 of each,tappet 11 are made of a hardened material and may be rotatably located on the remainder of the tappet 11. Pivotal movement of the lever arm 21 in the direction A (see FIG. 2) as a result of operation of the brake applying means (not shown) thus causes the force transmitting members 29 to move to the right in FIG. 2 forcing tappets 11 to move axially and apply friction pad 13 to one side of the braking disc 3.

Figure 7:
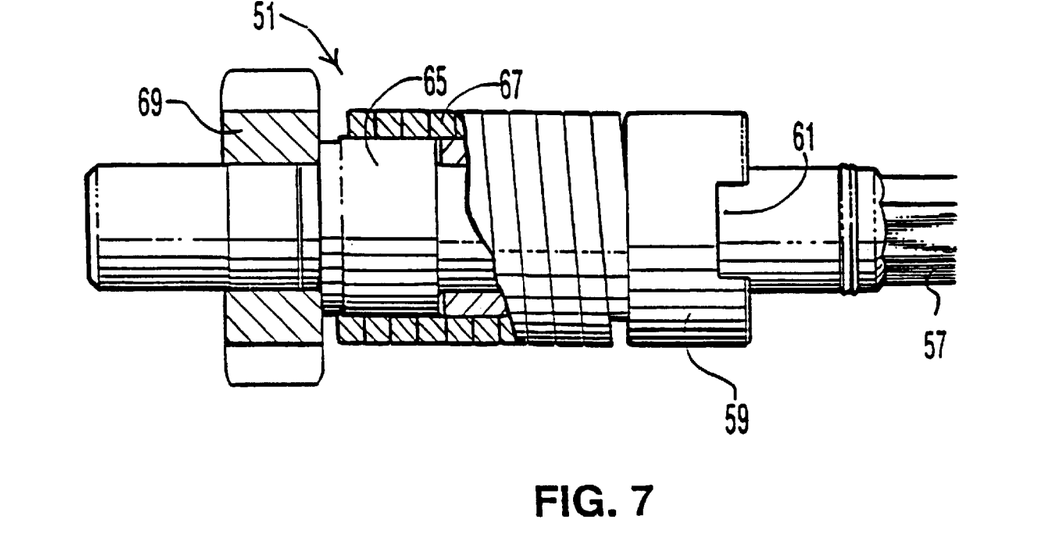
FIG. 7 is an enlarged view of the adjuster utilised in the embodiment of FIG. 1.
Figure 8:
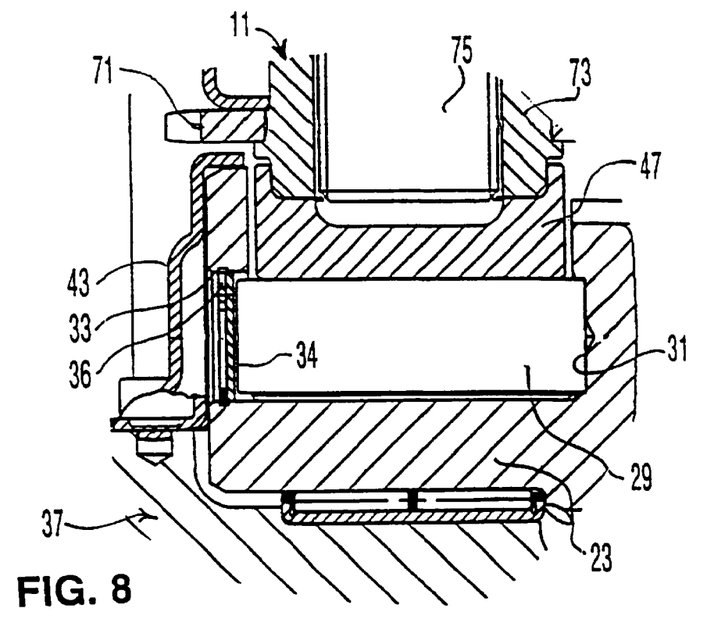
FIG. 8 is an enlarged view of the retaining means securing the actuating lever to the cover plate.

To cater for pad wear an adjustment mechanism is provided, the location of the adjuster mechanism being evident in FIG. 1 with the adjuster 51 being shown in enlarged detail in FIG. 7. The adjuster mechanism comprises the adjuster 51 which is activated via a lost motion arrangement by pivotal movement of the lever arm 21. As evident from FIGS. 1 and 2 a series of gear teeth 53 are provided on an axial end region of one of the cam sections 23 adjacent to the lever arm 21, these gear teeth 53 meshing with teeth on an annular gear wheel 55 which is mounted for rotation with a hub portion 55a in a central region of the rear i.e. inside, face of the cover plate 37. Thus, by pivotal movement of the lever arm 21, the gear wheel 55 is rotated. Extending through the centre of the annular gear wheel 55 is an extension 57 of the adjuster 51 (see FIG. 7), this extension having a hexagonal configuration to allow for manual return adjustment of the adjuster 51 as and when pads 13 and 15 are replaced. Adjacent to the extension 57 is a first part 59 of the adjuster which has a cut out 61 in which an axial extension of the gear wheel and hub assembly 55, 55a engages with clearance., this clearance providing for the lost motion necessary to allow for normal braking with no adjustment occurring, adjustment only occurring as and when sufficient wear has occurred, the clearance then being taken up by the rotation of the gear wheel causing the said one part 59 of the adjuster 51 to rotate. Said one part 59 has a cylindrical configuration (see FIG. 7) within which another part 65 engages. This other part 65 has an enlarged diameter section, the outer surface of which is of the same diameter as the cylindrical section of said one part 59. A rap spring 67 engages around these like diameter sections of said parts and causes said parts to rotate together in one direction but to allow said one part 59 to be freely rotatable from the other part 65 in the opposite rotational direction. Thus adjustment can occur only in one rotational direction. The wrap spring 67 is however designed to slip at a predetermined load upon brake actuation such that over adjustment is precluded for example during a heavy braking operation.

Mounted on said other part 65 of the adjuster 51 is a gear wheel 69 which, as seen in FIG. 1, meshes with gear wheels 71 on the respective tappets 49. Thus, rotation of the gear wheel 69 causes synchronous rotation of the meshed gear wheels 71 and as the gear wheels 71 are secured against rotation relative to an outer part 73 of each tappet 11, rotation of the gear wheels 71 causes said outer parts 73 to rotate about their longitudinal axis causing an inner part 75 of each tappet to be moved axially relative thereto, said inner and outer parts of each tappet being threadedly interengaged. Springs 77 are provided to bias the tappets 11 into engagement with the force transmitting members 29 and to also provide for the return movement of the tappets 11 after brake release.

Figure 4:
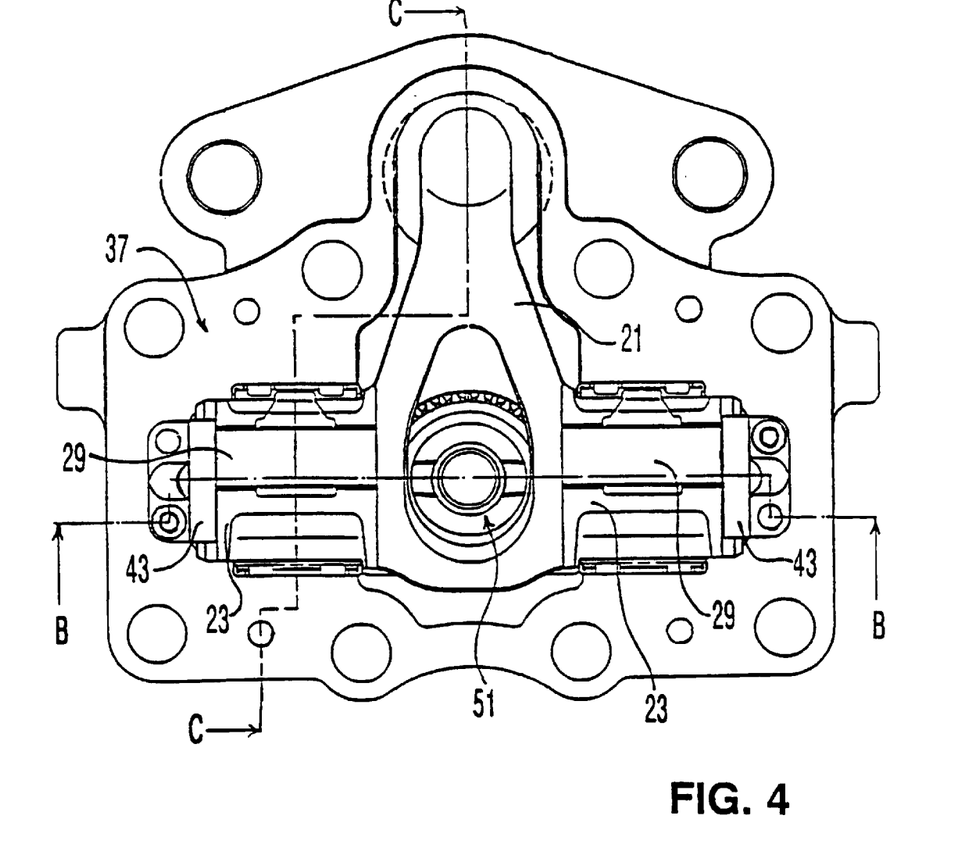
FIG. 4 is a rear i.e. inside, view of a modular assembly constructed according to the present invention.

As will be appreciated the lever arm 21 has a central aperture which can be seen more clearly from FIG. 4, through which the adjuster 51 extends, this central location of the adjuster providing for a balanced construction with the synchronous direct adjustment of the respective tappets by the adjuster 51.

Figure 9:
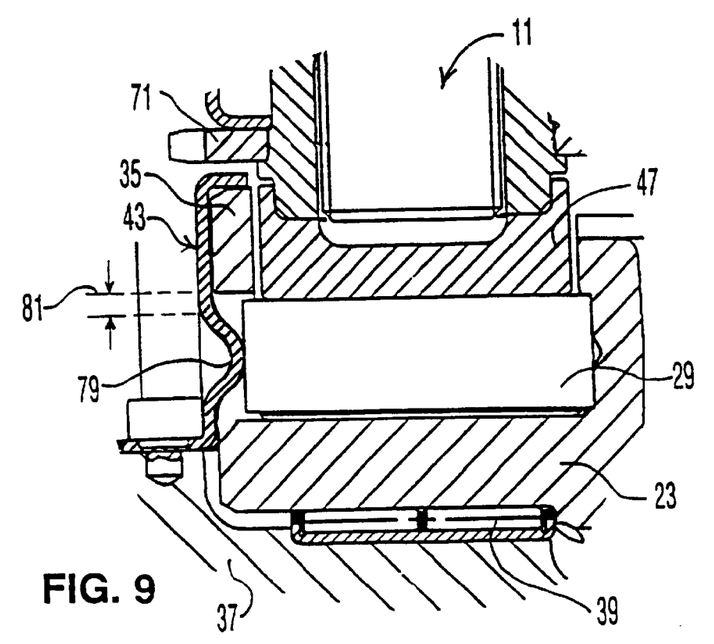
FIG. 9 is an enlarged view of part of the modular assembly of FIG. 4, with an alternative form of retaining means.

In the embodiment of the present invention described hereabove the cylindrical force transmitting members 29 are each held axially in the bores 31, 33, by the retaining disc 34 and circlip 36. However a modified arrangement is shown in FIG. 9 wherein the metal frame forming the retaining means 43 has an indent 79 which extends into the cylindrical bore 33, the indent 79 axially restraining the force transmitting member and removing the need for the disc 34 and circlip 36. As seen in FIG. 9 a clearance 681 is provided between the indent 79 and the wall of bore 33 to accommodate articulation of lever 21 and translating movement of the force transmitting member 29 due to its eccentric location relative to the longitudinal axis of the cam sections 23, about which the lever 21 pivots. In preferred form of brake, as described hereabove, with the adjuster 51 located between the tappets 11, there is no requirement for the brake to be handed as in previous constructions wherein the adjuster is located on one side of the brake and acts directly only on one tappet with said one tappet being coupled to the other tappet to provide for indirect adjustment thereof.

The present invention thus provides for a well balanced construction of this brake with the advantage of a modular assembly for the actuating lever 21, force transmitting member 29 and cover plate 37, this modular assembly being readily removeable and replaceable to facilitate servicing as necessary.

What is claimed is:

1. A modular assembly for a disc brake comprising a cover plate adapted to be, in use, secured to a clamp member of a disc brake, the plate having a curved support surface for an actuating lever comprising an elongate member, one end of which elongate member is adapted to be, in use, engaged by brake applying means, the other end region of said elongate member having a cam section with a part cylindrical curved surface having an elongate axis extending through the centre curvature of said surface, transversely of the longitudinal axis of the lever, said other end region also having a part cylindrical channel formed therein in a region separate from the part cylindrical curved surface, with an elongate cylindrical force transmitting member located therein and extending radially outwardly therefrom, the axis of the channel and the cylindrical force transmitting member being parallel to the longitudinal axis of the said part cylindrical surface, and the cylindrical force transmitting member having opposite end regions which are located in cylindrical recesses formed in the lever at opposite ends of said channel to thus retain the force transmitting member in position in the channel in the lever.

2. A modular assembly as claimed in claim 1, in which one said recess is formed as a cylindrical blind bore in said elongate member, and the other said recess is formed as a cylindrical bore in an extension of the cross section, with said cylindrical bore and said blind bore being coaxial with each other and with said channel.

3. A modular assembly as claimed in claim 2, in which a cylindrical force transmitting member is located in the channel, one end region of the force transmitting member being engaged in a said blind bore and the other end region being retained in said cylindrical bore.

4. A modular assembly as claimed in claim 3, in which a retaining disc and resilient circlip are engaged in said cylindrical bore to retain the force transmitting member in a desired axial position in the said channel.

5. A modular assembly as claimed in claim 4, in which gear teeth are provided adjacent the cam section with the teeth following the general path of the curved surface of the cam section, the gear teeth, in use, serving to operate the brake adjuster.

6. A modular assembly as claimed in claim 5, in which the gear teeth mesh with a gear wheel rotatably mounted on the cover plate, the gear wheel being engageable, in use, with the brake adjuster in the brake.

7. A modular assembly for a disc brake comprising a cover plate adapted to be, in use, secured to a clamp member of a disc brake, said cover plate having two curved support surfaces for supporting an actuating lever comprising an elongate member, one end of which is adapted to be, in use, engaged by brake applying means, the other end region having two cam sections which extend laterally in opposite directions from the lever arm, each cam section having a part cylindrical surface, said part cylindrical surfaces being carried on the said curved support surfaces of the cover plate, with the coaxial longitudinal axis of the cam sections extending transversely of the longitudinal axis of said elongate member, each cam section having a part cylindrical channel formed therein in a region separate from the part cylindrical surface thereof, an elongate cylindrical force transmitting member being located in each channel and extending radially outwardly therefrom, the axis of the channels and said cylindrical force transmitting members being parallel to the longitudinal axis of the said part cylindrical surfaces, with the cylindrical force transmitting members having opposite end regions which are located in cylindrical recesses formed in the lever at opposite ends of the respective channels to thus retain the force transmitting members in position in said channels on the lever, with retaining means holding the cam sections with their respective curved surfaces engaged with bearings carried on the respective curved support surfaces of the cover plate whereby the lever is pivotable about the said curved support surfaces.

8. A modular assembly as claimed in claim 7, in which for each cam section one said recess is formed as a cylindrical blind bore in said elongate member, and the other said recess is formed as a cylindrical bore in an extension of the cam section, with said cylindrical bore and said blind bore being coaxial with each other and with said channels.

9. A modular assembly as claimed in claim 8, in which a cylindrical force transmitting member is located in each channel, one end region of each force transmitting member being engaged in a said blind bore and the other end region being retained in a said cylindrical bore.

10. A modular assembly as claimed in claim 9, in which a retaining disc and resilient circlip are engaged in said cylindrical bores to retain the force transmitting members in their respective axial positions in the said channels.

11. A modular assembly as claimed in claim 9, in which the retaining means securing the cam sections to the cover plate hold the force transmitting members in the desired axial position within said channels.

12. A modular assembly as claimed in claim 11, in which said retaining means extend into said cylindrical bores in said cam sections and engage the respective force transmitting members.

13. A modular assembly as claimed in any one of claims 7 to 12, in which said elongate member is a generally triangular structure with said one end region of the elongate member located at one corner region and the lateral cam sections projecting in opposite directions from each of the other two corner regions, and an aperture in the central region of the triangular structure to, in use, allow for a centrally located adjuster which caters for pad wear.

14. A modular assembly as claimed in claim 13, in which gear teeth are provided between the two cam sections, with the teeth following the general path of the curved surface of one of the respective cam sections, the gear teeth, in use, serving to operate the brake adjuster.

15. A modular assembly as claimed in claim 14, in which the gear teeth mesh with a gear wheel rotatably mounted on the cover plate, the gear wheel being engageable, in use, with the brake adjuster in the brake.

* * * * *

UNITED STATES PATENT AND TRADEMARK OFFICE
CERTIFICATE OF CORRECTION

PATENT NO.     : 6,336,686 B2
DATED          : January 8, 2002
INVENTOR(S)    : Paul Antony Thomas et al.

It is certified that error appears in the above-identified patent and that said Letters Patent is hereby corrected as shown below:

<u>Title page,</u>
Item [54], Title, the word "LEVEL" should be changed to -- LEVER --.
Item [56], References Cited, FOREIGN PATENT DOCUMENTS, after
"WO    95/19511   *   7/1995," please add, as follows:
-- WO   92/07202   *   4/1992
WO     93/22579   *   11/1993 --.

Signed and Sealed this

Twenty-second Day of October, 2002

*Attest:*

*Attesting Officer*

JAMES E. ROGAN
*Director of the United States Patent and Trademark Office*